United States Patent
Hasegawa

(10) Patent No.: US 10,780,862 B2
(45) Date of Patent: Sep. 22, 2020

(54) VEHICLE WIPER DEVICE

(71) Applicant: DENSO CORPORATION, Kariya-shi, Aichi (JP)

(72) Inventor: Takashi Hasegawa, Kosai (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 29 days.

(21) Appl. No.: 16/060,420

(22) PCT Filed: Nov. 30, 2016

(86) PCT No.: PCT/JP2016/085636
§ 371 (c)(1),
(2) Date: Jun. 8, 2018

(87) PCT Pub. No.: WO2017/104419
PCT Pub. Date: Jun. 22, 2017

(65) Prior Publication Data
US 2019/0001928 A1   Jan. 3, 2019

(30) Foreign Application Priority Data
Dec. 16, 2015  (JP) .................. 2015-245416

(51) Int. Cl.
*B60S 1/24* (2006.01)
*B60S 1/04* (2006.01)
(Continued)

(52) U.S. Cl.
CPC ............ *B60S 1/245* (2013.01); *B60S 1/0425* (2013.01); *B60S 1/0433* (2013.01); *B60S 1/28* (2013.01);
(Continued)

(58) Field of Classification Search
CPC .... B60S 1/0469; B60S 1/0491; B60S 1/0425; B60S 1/0433; B60S 1/24; B60S 1/0405;
(Continued)

(56) References Cited

U.S. PATENT DOCUMENTS

| 2004/0034959 | A1 | 2/2004 | Nakamura | |
| 2006/0005341 | A1* | 1/2006 | Lee | B60S 1/0433 15/250.31 |
| 2012/0297566 | A1* | 11/2012 | Motono | B60S 1/0425 15/250.31 |

FOREIGN PATENT DOCUMENTS

JP   2015-105025 A   6/2015

* cited by examiner

Primary Examiner — Gary K. Graham
(74) Attorney, Agent, or Firm — Solaris Intellectual Property Group, PLLC

(57) ABSTRACT

The versatility of a water collecting member is raised while improving the ease of assembly of the water collecting member. A water collecting member 80 is formed with plural first marks 90 serving as markers for assembly of the water collecting member 80 to a first pivot holder 20. The first pivot holder 20 is formed with a second mark 92 serving as a guide for the correct assembly orientation of the water collecting member 80 to the first pivot holder 20. The second mark 92 is formed corresponding to one out of the plural first marks 90, and is configured so as to form a pair with that first mark 90. The water collecting member 80 can be assembled in the correct position by aligning the second mark 92 and the first mark 90 that form a pair when assembling the water collecting member 80 to the first pivot holder 20. This thereby enables incorrect assembly of the water collecting member 80 to be prevented when assembling the water collecting member 80 to the first pivot holder 20 in cases in which a universal water collecting member 80 is employed in various vehicle models.

11 Claims, 12 Drawing Sheets

(51) Int. Cl.
*B60S 1/34* (2006.01)
*B60S 1/28* (2006.01)
*B60R 13/07* (2006.01)

(52) U.S. Cl.
CPC ............... *B60S 1/34* (2013.01); *B60S 1/349* (2013.01); *B60R 13/07* (2013.01); *B60S 1/0491* (2013.01)

(58) Field of Classification Search
CPC .......... B60S 1/0436; B60S 1/245; B60S 1/28; B60R 13/07
USPC ................. 15/250.3, 250.31; 296/192, 97.17
See application file for complete search history.

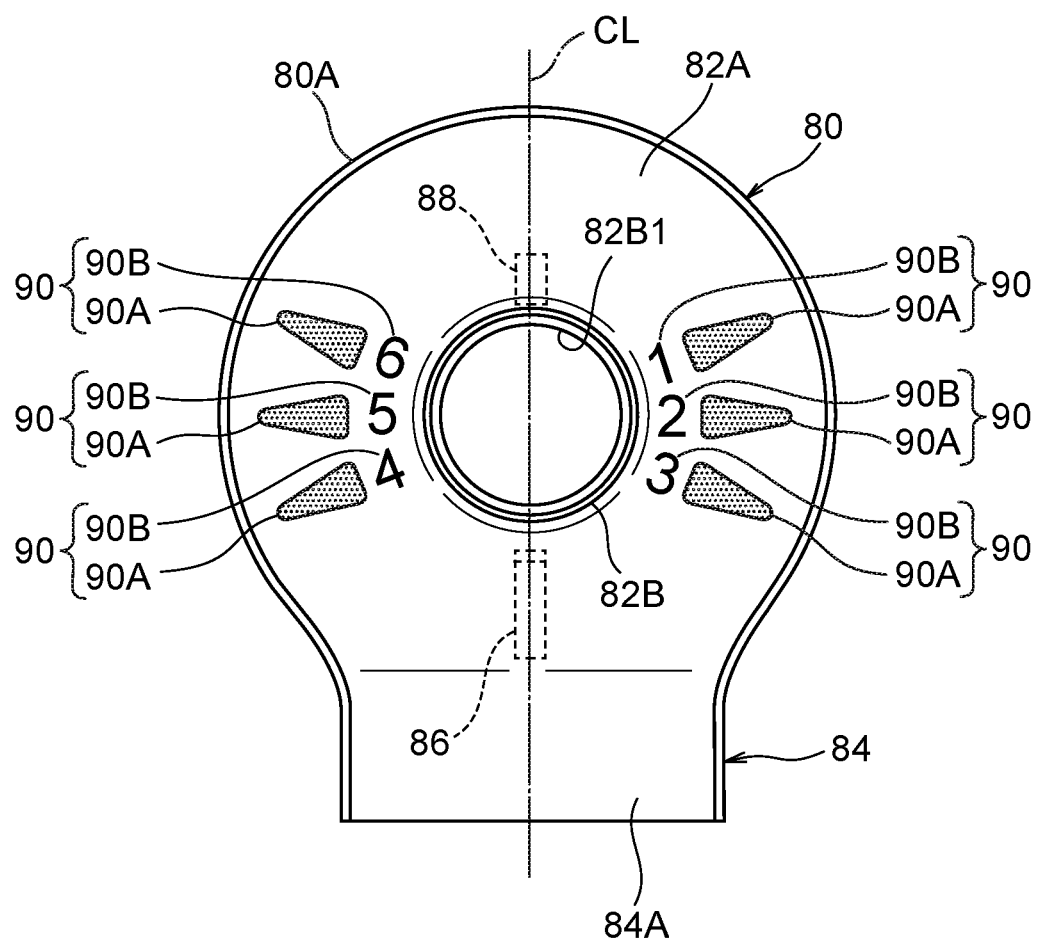

VEHICLE WIPER DEVICE

TECHNICAL FIELD

The present disclosure relates to a vehicle wiper device.

BACKGROUND ART

A vehicle wiper device described in Japanese Patent Application Laid-Open (JP-A) No. 2015-105025 is configured as what is referred to as modular wiper device. A pair of left and right of pivot holders that rotatably support a pair of pivot shafts respectively are coupled together through a frame member (a pipe frame or the like). In this modular wiper device, a water collecting member is assembled to each of the pair of left and right pivot holders. Liquid entering through a leading end side of each pivot shaft is caught by the water collecting member, and the liquid is drained from a drainage portion of the water collecting member.

SUMMARY OF INVENTION

Technical Problem

In vehicle wiper devices, the orientation of a water collecting member (specifically, the direction of a drainage portion of the water collecting member as viewed along the axial direction of a pivot shaft) may differ between various vehicle wiper devices, or may differ between the left and right pivot holders. In such cases, configuring the pivot holder with an assembly structure corresponding to the orientation of the water collecting member enables a universal water collecting member to be employed.

However, in such cases it is necessary for a worker to be aware of the orientations of the water collecting member in various vehicle wiper devices when assembling the water collecting members to pivot holders. There is therefore a concern that water collecting members might be assembled to pivot holders incorrectly.

In consideration of the above circumstances, an object of the present disclosure is to provide a vehicle wiper device capable of improving the ease of assembly of a water collecting member, while increasing the versatility of the water collecting member.

Solution to Problem

A vehicle wiper device of a first aspect of the present disclosure includes a pivot shaft, a pivot holder, and a water collecting member. The pivot shaft is rotated by drive force of a wiper motor. The pivot holder rotatably supports the pivot shaft. The water collecting member is assembled to the pivot holder and includes a water collecting portion disposed at a radial direction outside of the pivot shaft and a drainage portion extending from a predetermined position on the water collecting portion toward the radial direction outside of the pivot shaft so as to drain liquid collected by the water collecting portion. Moreover, the water collecting member is formed with plural first marks configuring markers used in assembly of the water collecting member to the pivot holder, and the pivot holder is formed with a second mark that forms a pair with one out of the plural first marks and that configures a guide for a correct assembly orientation of the water collecting member to the pivot holder. Note that there are plural types of the pivot holder. An attachment direction of the water collecting member to the pivot holder is different for each of the plural types of the pivot holder. The second mark includes an identifying mark and a positioning mark corresponding to the type of the pivot holder, and each of the plural first marks includes an identifying mark and a positioning mark respectively corresponding to the type of the pivot holder. Moreover, the identifying mark and the positioning mark of the second mark, and the identifying mark and the positioning mark of each of the plural first marks, are disposed such that the water collecting member is assembled in a direction corresponding to the type of the pivot holder when the water collecting member is assembled to the pivot holder such that the identifying mark of the second mark and the identifying mark of the first mark correspond with each other and the positioning mark of the second mark and the positioning mark of the first mark face each other along the radial direction of the pivot shaft.

In the above configuration, the pivot shaft is rotatably supported by the pivot holder, and the pivot shaft is rotated by drive force of the wiper motor. The water collecting member is assembled to the pivot holder. The water collecting member is configured including the water collecting portion disposed at the radial direction outside of the pivot shaft, and the drainage portion extending from a predetermined position on the water collecting portion toward the radial direction outside of the pivot shaft so as to drain liquid collected by the water collecting portion.

The water collecting member is formed with the plural first marks configuring markers used in assembly of the water collecting member to the pivot holder. The pivot holder is formed with the second mark that forms configures a guide for a correct assembly orientation of the water collecting member to the pivot holder. Moreover, the second mark forms a pair with one out of the plural first marks. The water collecting member can thereby be assembled in the correct position by aligning the first mark and the second mark that form a pair when assembling the water collecting member to the pivot holder. Accordingly, for example, forming the first marks and the second mark corresponding to various vehicle wiper devices enables incorrect assembly of the water collecting member to be prevented while employing a universal water collecting member with various vehicle wiper devices. Moreover, for example, forming the first mark and the second mark so as to correspond to pivot holders on a driver's seat side and a front passenger seat side enables incorrect assembly of the water collecting member to be prevented when employing a universal water collecting member for pivot holders on the driver's seat side and the front passenger seat side.

In a vehicle wiper device of a second aspect of the present disclosure, as viewed from a leading end side of the pivot shaft the plural first marks are formed on one side of a reference line passing through an axis of the pivot shaft and extending along an extension direction of the drainage portion.

In the above configuration, for example forming the first marks and the second mark so as to correspond to a pivot holder on a driver's seat side (or a front passenger seat side) of various vehicle wiper devices enables incorrect assembly of the water collecting member to be prevented when employing a universal water collecting member for the pivot holder on the driver's seat side of various vehicle wiper devices.

In a vehicle wiper device of a third aspect of the present disclosure, the pivot shafts include a first pivot shaft and a second pivot shaft that are rotated by drive force of the wiper motor being transmitted through a link mechanism. The pivot holders include a first pivot holder that rotatably supports the first pivot shaft and a second pivot holder that rotatably supports the second pivot shaft. Plural of the first marks are formed on each side of a reference line passing through an axis of the pivot shaft and extending along an extension direction of the drainage portion as viewed from a leading end side of the pivot shaft. Moreover, the second marks are respectively formed at the first pivot holder and the second pivot holder.

In the above configuration, for example forming the first marks and the second mark so as to correspond to a pair of pivot holders of various vehicle wiper devices enables incorrect assembly of the water collecting member to be prevented when employing a universal water collecting member for the pairs of pivot holders of various vehicle wiper devices.

In a vehicle wiper device of a fourth aspect of the present disclosure, the first marks and the second mark are disposed so as to be visible when viewed from a leading end side of the pivot shaft. Note that the water collecting member includes the collecting portion that includes a collecting face visible when viewed from the leading end side of the pivot shaft, and the first marks are formed on this collecting face.

The above configuration enables the water collecting member to be assembled to the pivot holder from the leading end side of the pivot shaft while confirming the first marks and the second mark. This thereby enables the ease of assembly of the water collecting member to be further improved.

In a vehicle wiper device of a fifth aspect of the present disclosure, the water collecting member includes an engaging projection and an engaging claw portion. The engaging projection projects from the water collecting portion toward a base end side of the pivot shaft and limits peripheral direction movement of the water collecting member in a state in which the engaging projection is engaged with the pivot holder in the peripheral direction. The engaging claw portion projects from the water collecting portion toward the base end side of the pivot shaft and limits movement of the water collecting member toward a leading end side of the pivot shaft in a state in which the engaging claw portion is engaged with the pivot holder in an axial direction. Moreover, as viewed along an axial direction of the pivot shaft, the engaging claw portion is disposed on the drainage portion side of pivot shaft, and the engaging projection is disposed on the opposite side of the pivot shaft to the drainage portion. The pivot holder includes a sleeve formed with a first engagement portion to engage with the engaging claw portion and a second engagement portion to engage with the engaging projection, and the sleeve supports the pivot shaft.

In the configurations of each of the above aspects, peripheral direction movement of the water collecting member with respect to the pivot holder is limited by the engaging projection of the water collecting member, and movement of the water collecting member toward the leading end side of the pivot shaft with respect to the pivot holder is limited by the engaging claw portion of the water collecting member. This thereby enables the assembled state of the water collecting member to the pivot holder to be maintained. As viewed along the axial direction of the pivot shaft, the engaging claw portion is disposed on the drainage portion side of the pivot shaft. This thereby enables the assembled state of the water collecting member to the pivot holder to be maintained while also raising the rigidity of the drainage portion with the engaging claw portion.

BRIEF DESCRIPTION OF DRAWINGS

FIG. 6B is a plan view illustrating the water collecting member illustrated in FIG. 6A.

DESCRIPTION OF EMBODIMENTS

Figure 2:
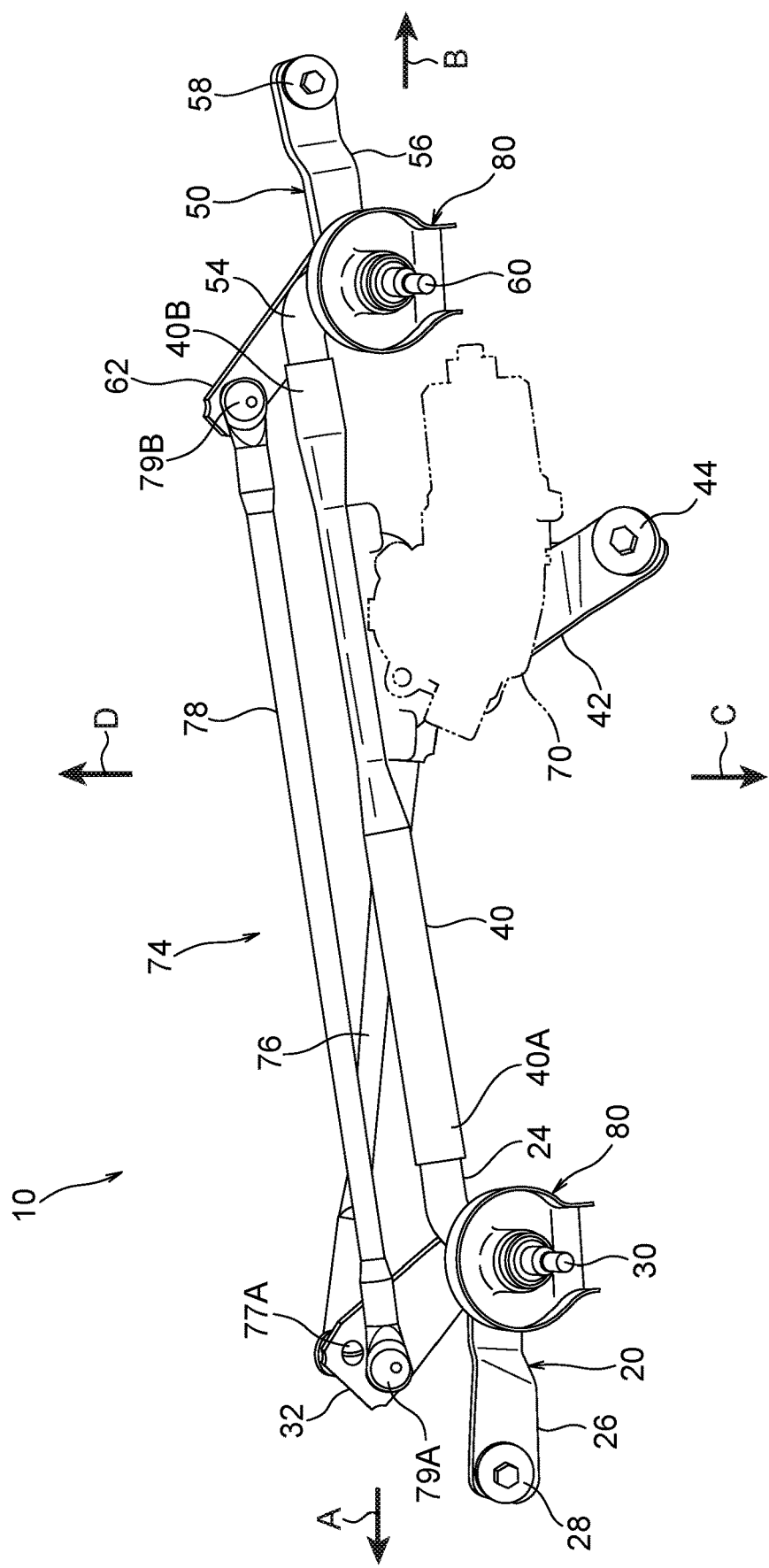
FIG. 2 is a plan view illustrating the overall vehicle wiper device illustrated in FIG. 1, as viewed from a vehicle upper side.
Figure 3:
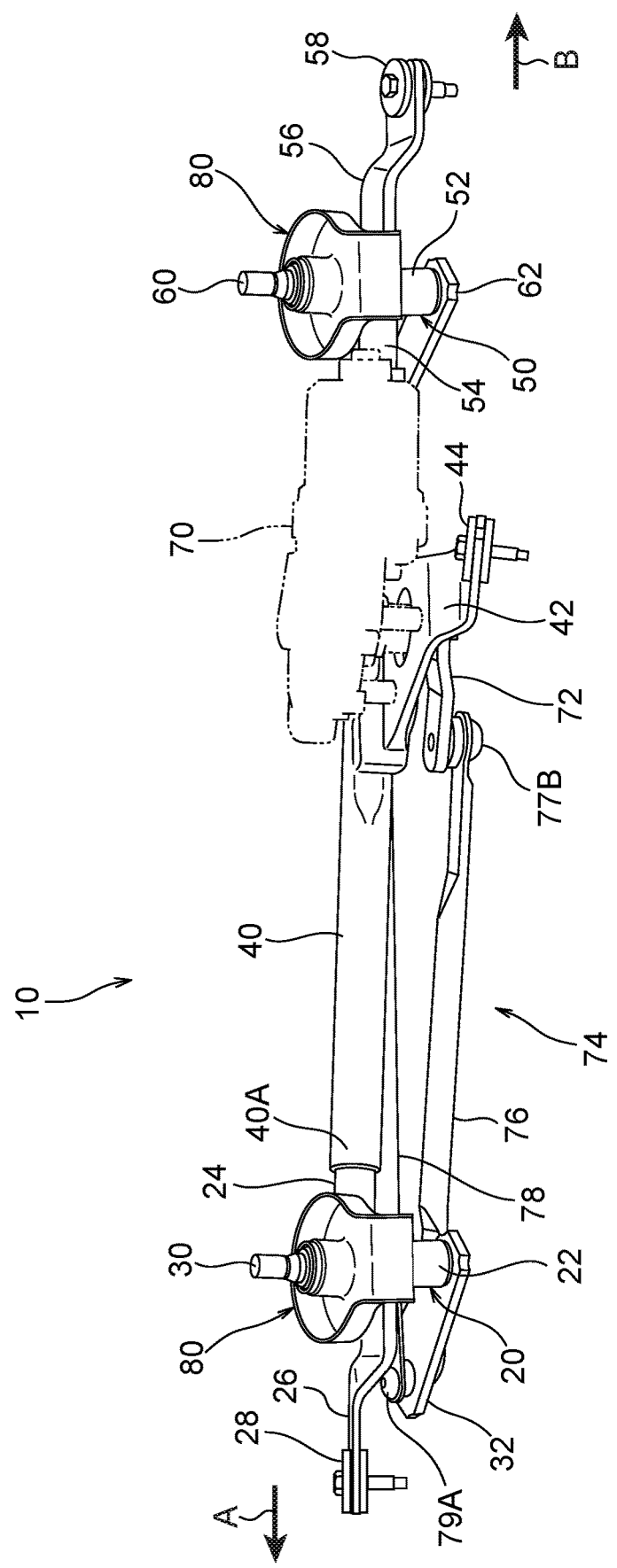
FIG. 3 is a perspective view illustrating the overall vehicle wiper device illustrated in FIG. 2, as viewed diagonally from the upper front of the vehicle.

Explanation follows regarding a vehicle wiper device 10 according to an exemplary embodiment, with reference to the drawings. The vehicle wiper device 10 is a wiper device for the front windshield glass of a vehicle (automobile), and is configured as what is referred to as a modular wiper device. The vehicle wiper device 10 extends in a vehicle width direction of the vehicle, and is disposed at a vehicle inside of a cowl cover (not illustrated in the drawings) of the vehicle. FIG. 2 is a plan view illustrating the overall configuration of the vehicle wiper device 10 as viewed from a vehicle upper side. FIG. 3 is a perspective view illustrating the overall configuration of the vehicle wiper device 10 as viewed diagonally from the upper front of the vehicle. In the drawings, the arrow A and arrow B indicate the vehicle width direction of the vehicle (the length direction of the vehicle wiper device 10), the arrow C indicates the vehicle front side (referred to simply as the front side hereafter), and the arrow D indicates the vehicle rear side (referred to simply as the rear side hereafter), as appropriate.

As illustrated in the drawings, the vehicle wiper device 10 is configured including a first pivot holder 20, a first pivot shaft 30, a hollow frame 40, a second pivot holder 50, and a second pivot shaft 60. The vehicle wiper device 10 also includes a wiper motor 70, a link mechanism 74, and water collecting members 80. The configuration of each is described below. The first pivot holder 20 and the second pivot holder 50 are examples of "pivot holders". The first pivot shaft 30 and the second pivot shaft 60 are examples of "pivot shafts".

First Pivot Holder 20

Figure 4:
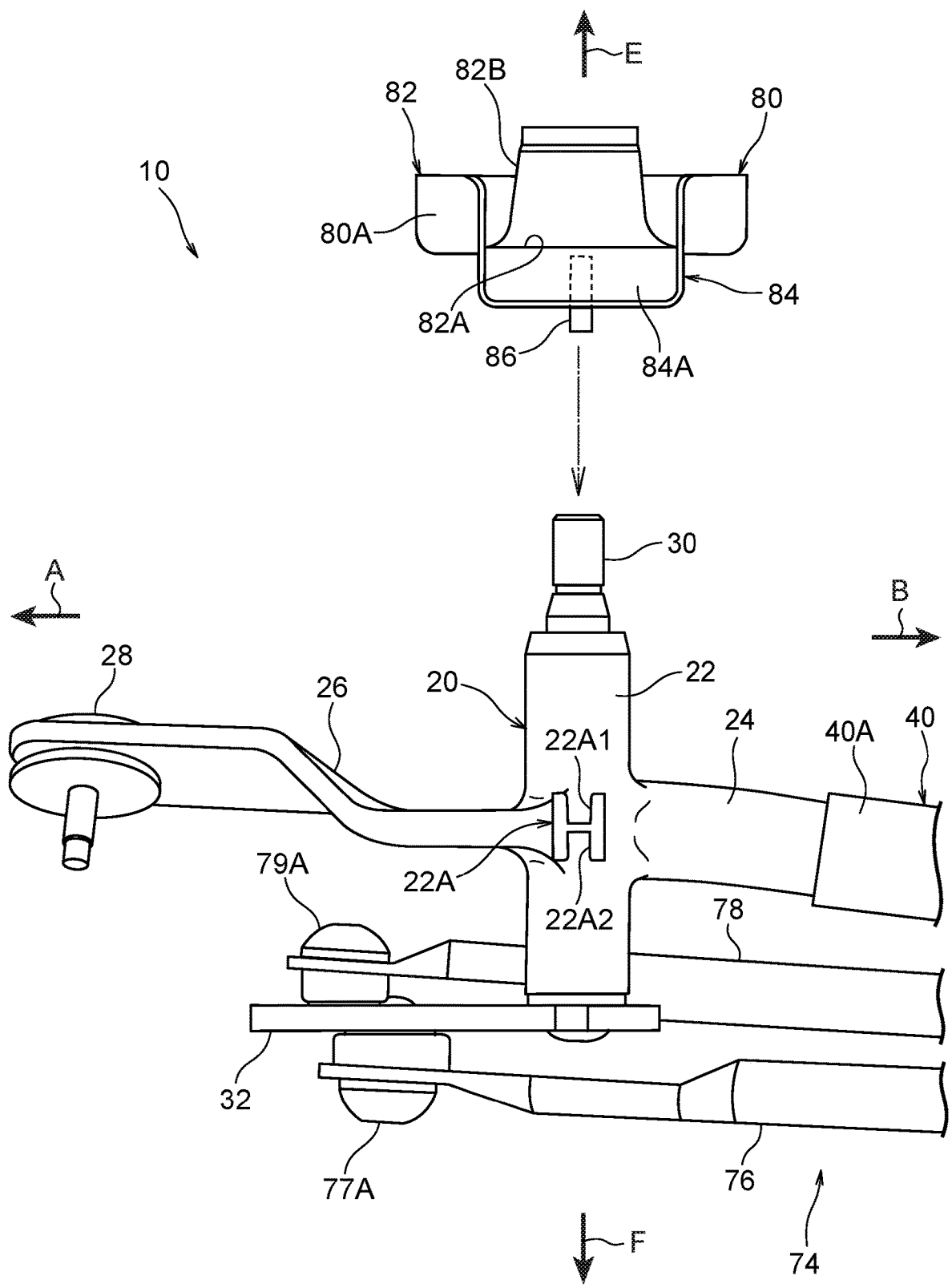
FIG. 4 is a front view illustrating the water collecting member illustrated in FIG. 1A in a state removed from the first pivot holder.
Figure 5:
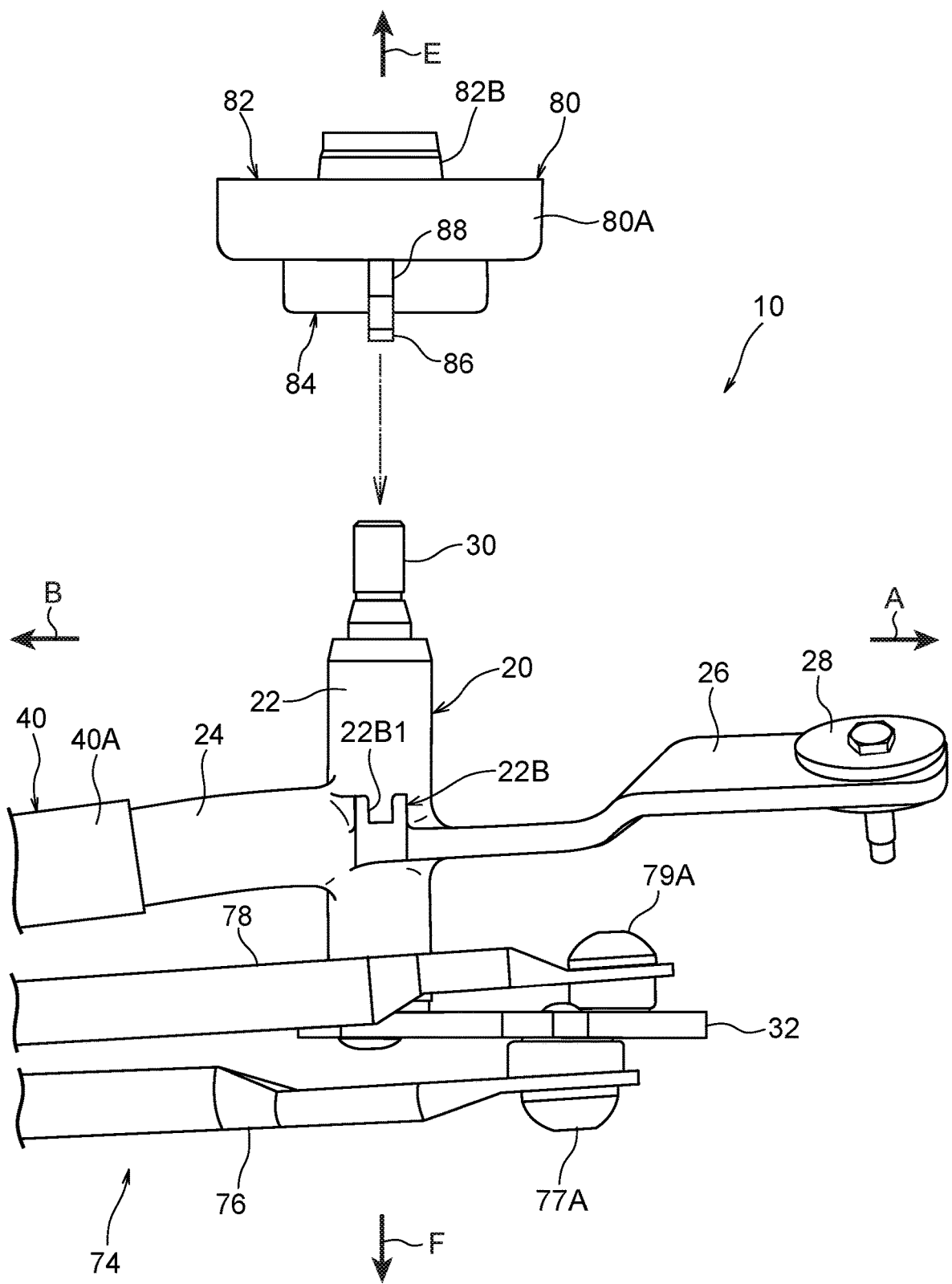
FIG. 5 is a rear view illustrating the water collecting member illustrated in FIG. 1A in a state removed from the first pivot holder.

The first pivot holder 20 is provided on one length direction side of the vehicle wiper device 10 (the arrow A direction side in FIG. 2 and FIG. 3). The first pivot holder 20 is manufactured from a die-cast aluminum alloy or the like. As illustrated in FIG. 4 and FIG. 5, the first pivot holder 20 includes a sleeve 22 (an element that may be broadly interpreted as a "support portion") that rotatably supports the first pivot shaft 30, described later. The sleeve 22 is formed in a substantially cylinder shape.

The sleeve 22 is integrally formed with a coupler portion 24. The coupler portion 24 is formed in a solid shaft shape, and extends from an axial direction intermediate portion of the sleeve 22 toward the other length direction side of the vehicle wiper device 10 (the arrow B direction side in FIG. 2 and FIG. 3).

A fixing leg portion 26 is integrally provided to an outer peripheral portion of the sleeve 22. The fixing leg portion 26 is formed in a plate shape with its plate thickness direction running substantially in the axial direction of the sleeve 22, and extends from an axial direction intermediate portion of the sleeve 22 toward the one length direction side of the vehicle wiper device 10 (the opposite side to the coupler portion 24). A leading end portion of the fixing leg portion 26 is fixed to a vehicle body in a floating state via a rubber grommet 28.

As illustrated in FIG. 4 and FIG. 5, the outer peripheral portion of the sleeve 22 is integrally formed with a first engagement portion 22A (see FIG. 4) and a second engagement portion 22B (see FIG. 5) that respectively engage with an engaging claw portion 86 and an engaging projection 88 of the water collecting member 80, described later. As illustrated in FIG. 1B and FIG. 4, the first engagement portion 22A projects from the sleeve 22 toward the front side, and in front view, is formed as a substantially H-shaped block. Namely, the first engagement portion 22A is formed with a recess portion 22A1 opening toward one axial direction side of the sleeve 22 (the arrow E direction side in FIG. 4), and a recess portion 22A2 opening toward the other axial direction side of the sleeve 22 (the arrow F direction side in FIG. 4).

As illustrated in FIG. 1B and FIG. 5, the second engagement portion 22B projects from the sleeve 22 toward the rear. As viewed from the one axial direction side of the sleeve 22, the first engagement portion 22A and the second engagement portion 22B are disposed on opposite sides of an axis of the sleeve 22 (more specifically, at positions with point symmetry to each other). As viewed from the rear, the second engagement portion 22B is formed as a substantially U-shaped block. Namely, the second engagement portion 22B is formed with a recess portion 22B1 opening toward the one axial direction side of the sleeve 22.

First Pivot Shaft 30

As illustrated in FIG. 4 and FIG. 5, the first pivot shaft 30 is inserted into the sleeve 22, and is rotatably supported by the sleeve 22. A leading end portion of the first pivot shaft 30 (an end portion on the arrow E direction side in FIG. 4 and FIG. 5) is fixed to a base end portion of a wiper arm (not illustrated in the drawings), and a leading end portion of the wiper arm is coupled to a wiper blade, not illustrated in the drawings. On the other hand, a first lever 32 that extends toward the radial direction outside of the first pivot shaft 30 is fixed to a base end portion of the first pivot shaft 30. When the first lever 32 rotates about the first pivot shaft 30, the wiper arm rotates about the first pivot shaft 30 accompanying the first pivot shaft 30, and the wiper blade wipes the front windshield glass of the vehicle. Note that the first pivot shaft 30 is angled so as to be inclined toward the front with respect to the up-down direction of the vehicle.

Hollow Frame 40

As illustrated in FIG. 2 and FIG. 3, the hollow frame 40 is manufactured from a hollow elongated pipe material, and is disposed coaxially with the coupler portion 24 of the first pivot holder 20. One length direction end portion of the hollow frame 40 configures a first fixing portion 40A. The coupler portion 24 of the first pivot holder 20 is fitted into the first fixing portion 40A, and the first fixing portion 40A is fixed to the coupler portion 24 by swaging or the like. On the other hand, the other length direction end portion of the hollow frame 40 configures a second fixing portion 40B. The second fixing portion 40B is fixed to the second pivot holder 50, described later, by swaging or the like.

A length direction intermediate portion of the hollow frame 40 is fixed to a bracket 42 for attaching the wiper motor 70, described later. The bracket 42 is formed in a substantially triangular plate shape with its plate thickness direction substantially in the axial direction of the first pivot shaft 30. The bracket 42 projects from the hollow frame 40 toward the front. A leading end portion projecting toward the front of the bracket 42 is fixed to the vehicle body in a floating state via a rubber grommet 44.

Second Pivot Holder 50

The second pivot holder 50 is provided at the other length direction side of the vehicle wiper device 10 (the arrow B direction side in FIG. 2 and FIG. 3). The second pivot holder 50 is manufactured from a die-cast aluminum alloy or the like, similarly to the first pivot holder 20. The second pivot holder 50 includes a cylinder shaped sleeve 52 (an element that may be broadly interpreted as a "support"). The sleeve 52 (see FIG. 3) is disposed so as to run substantially parallel to the sleeve 22 of the first pivot holder 20.

A solid shaft-shaped coupler portion 54 is integrally provided to an outer peripheral portion of the sleeve 52. The coupler portion 54 extends from an axial direction intermediate portion of the sleeve 52 toward the one length direction side of the vehicle wiper device 10, and a leading end portion of the coupler portion 54 is disposed coaxially with the hollow frame 40. The leading end portion of the coupler portion 54 is fitted into the second fixing portion 40B of the hollow frame 40, and the second fixing portion 40B is fixed to the leading end portion of the coupler portion 54 by swaging or the like. The first pivot holder 20 and the second pivot holder 50 are thereby coupled together through the hollow frame 40.

A fixing leg portion 56 is integrally provided to the outer peripheral portion of the sleeve 52. The fixing leg portion 56 is formed in a plate shape with its plate thickness direction substantially in the axial direction of the sleeve 52, and extends from an axial direction intermediate portion of the sleeve 52 toward the other length direction side of the vehicle wiper device 10 (the opposite side to the coupler portion 54). A leading end portion of the fixing leg portion 56 is fixed to the vehicle body in a floating state via a rubber grommet 58.

Moreover, although not illustrated in the drawings, a first engagement portion and a second engagement portion that respectively engage with the engaging claw portion 86 and the engaging projection 88 of the water collecting member 80, described later, are integrally formed to the outer peripheral portion of the sleeve 52. The first engagement portion and the second engagement portion are configured similarly to the first engagement portion 22A (see FIG. 4) and the second engagement portion 22B (see FIG. 5) of the first pivot holder 20. Namely, the first engagement portion of the second pivot holder 50 projects from the sleeve 52 toward the front, and is formed as a substantially H-shaped block in front view. The second engagement portion of the second pivot holder 50 projects from the sleeve 52 toward the rear, and is formed as a substantially U-shaped block as viewed from the rear.

Second Pivot Shaft 60

As illustrated in FIG. 3, the second pivot shaft 60 is inserted into the sleeve 52 and is rotatably supported by the sleeve 52. A leading end portion of the second pivot shaft 60 is fixed to a base end portion of a wiper arm (not illustrated in the drawings), and a leading end portion of the wiper arm is coupled to a wiper blade, not illustrated in the drawings. On the other hand, a second lever 62 that extends toward a radial direction outside of the second pivot shaft 60 is fixed to a base end portion of the second pivot shaft 60. When the second lever 62 rotates about the second pivot shaft 60, the wiper arm rotates about the second pivot shaft 60 accompanying the second pivot shaft 60, and the wiper blade wipes the front windshield glass.

Wiper Motor 70

As illustrated in FIG. 3, the wiper motor 70 is disposed on the bracket 42 mentioned above on the one axial direction side of the first pivot shaft 30, and is fastened and fixed to the bracket 42 using a fastening member such as a screw. The wiper motor 70 includes an output shaft (not illustrated in the drawings) for outputting drive force from the wiper motor 70, and a leading end portion of the output shaft is fixed to a crank arm 72. When the wiper motor 70 is actuated, the crank arm 72 rotates about the output shaft.

Link Mechanism 74

As illustrated in FIG. 2 and FIG. 3, the link mechanism 74 is configured so as to transmit drive force of the wiper motor 70 to the first pivot shaft 30 and the second pivot shaft 60. The link mechanism 74 includes a first link rod 76. The first link rod 76 is manufactured from a substantially elongated pipe material. One length direction end portion of the first link rod 76 is swingably drive-coupled to a leading end portion of the first lever 32 through a ball joint 77A, and another length direction end portion of the first link rod 76 is swingably drive-coupled to the crank arm 72 through a ball joint 77B (see FIG. 3). The wiper motor 70 and the first pivot shaft 30 are thereby coupled together through the first link rod 76 so as to transmit drive force of the wiper motor 70 to the first pivot shaft 30.

The link mechanism 74 also includes a second link rod 78. The second link rod 78 is also manufactured from a substantially elongated pipe material, similarly to the first link rod 76. One length direction end portion of the second link rod 78 is swingably drive-coupled to the leading end portion of the first lever 32 via a ball joint 79A (see FIG. 2), and another length direction end portion of the second link rod 78 is swingably drive-coupled to the leading end portion of the second lever 62 via a ball joint 79B (see FIG. 2). The first lever 32 and the second lever 62 are thereby coupled together by the second link rod 78, such that drive force transmitted to the second lever 62 from the wiper motor 70 is also transmitted to the second pivot shaft 60 in a linked action.

Next, explanation follows regarding the water collecting members 80, followed by explanation regarding marks that configure guides for assembling the water collecting members 80 to the first pivot holder 20 and the second pivot holder 50.

Water Collecting Members 80

As illustrated in FIG. 2 and FIG. 3, the water collecting members 80 are assembled to the first pivot holder 20 and the second pivot holder 50 respectively. Structures for assembling the water collecting members 80 to the first pivot holder 20 and the second pivot holder 50 are configured similarly to each other. Accordingly, the following explanation describes the configuration of the water collecting members 80 based on the water collecting member 80 that is assembled to the first pivot holder 20.

Figure 1A:
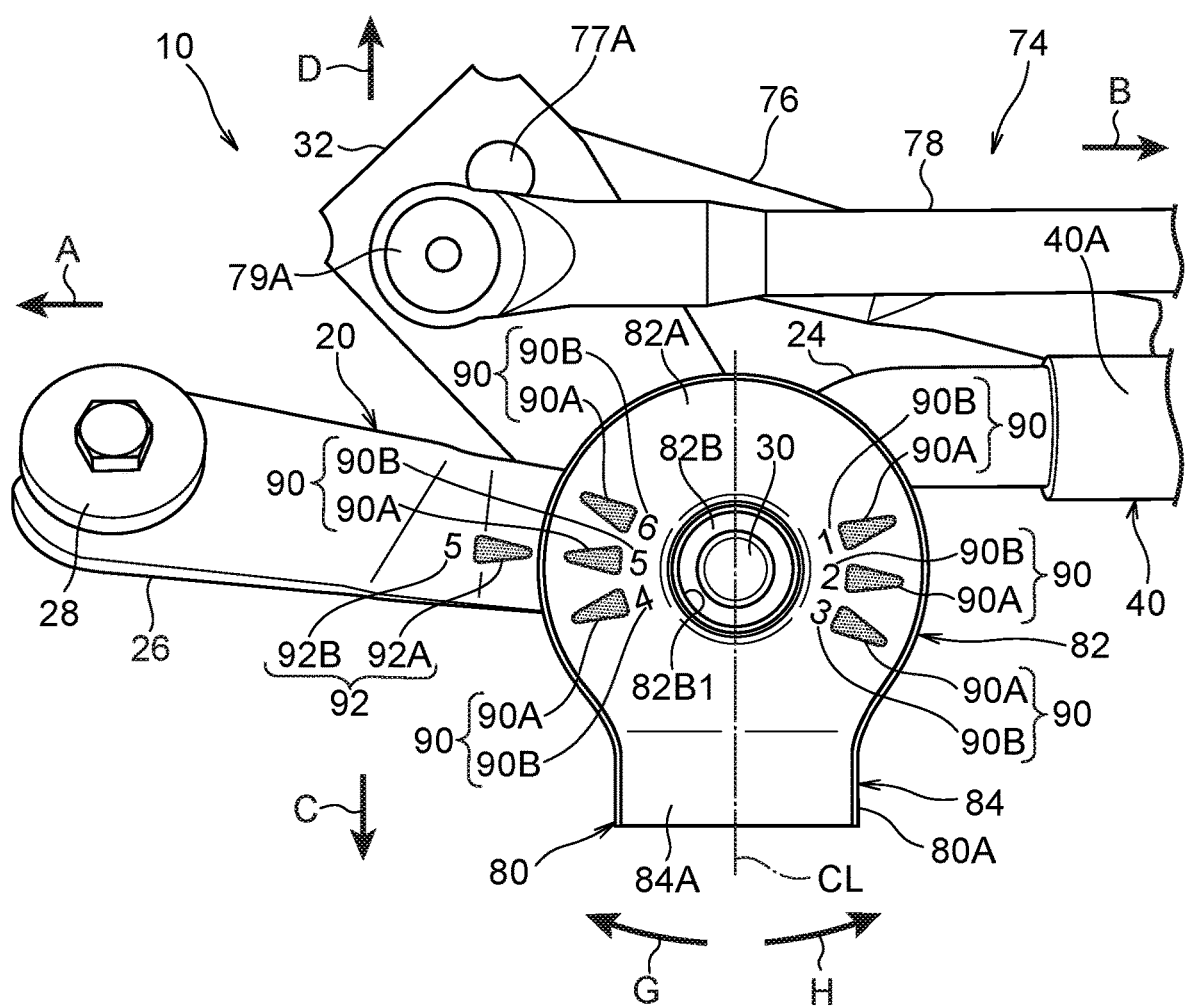
FIG. 1A is a plan view illustrating an assembled state of a water collecting member to a first pivot holder in a vehicle wiper device according to an exemplary embodiment, as viewed from a leading end side of a first pivot shaft.
Figure 1B:
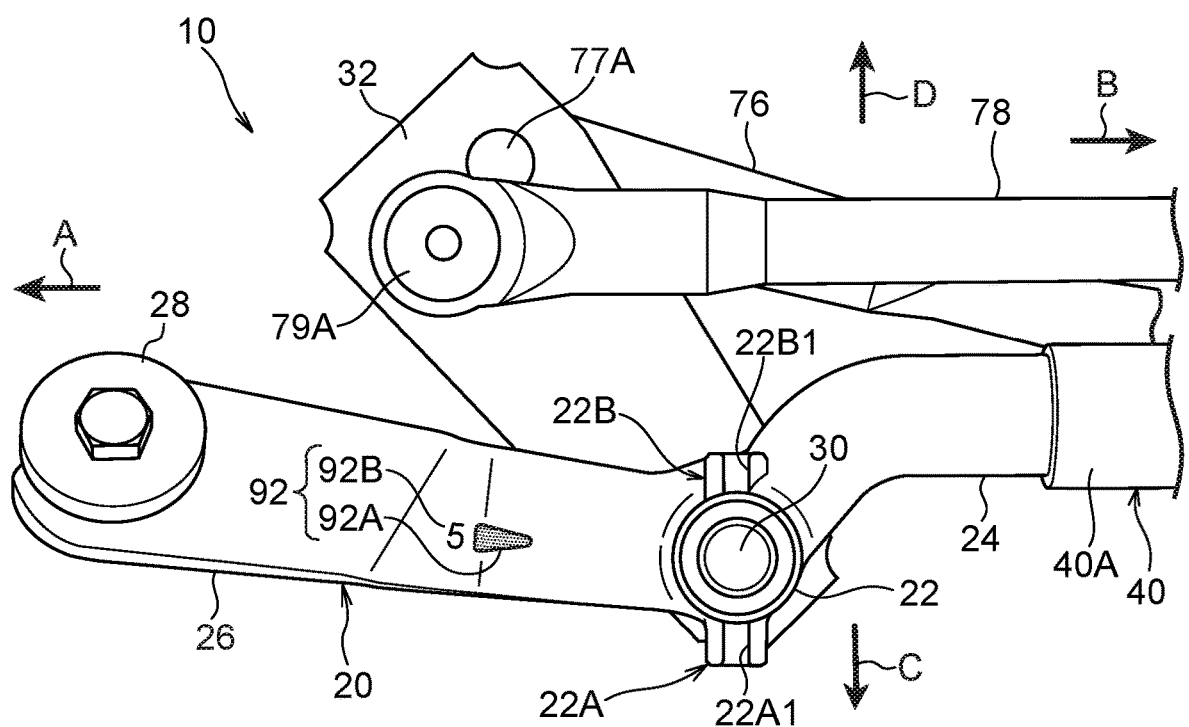
FIG. 1B is a plan view illustrating the water collecting member in FIG. 1A in a state removed from the first pivot holder.

As illustrated in FIG. 1A and FIG. 1B, the water collecting member 80 is made from resin, and is configured including a water collecting portion 82 and a drainage portion 84. The water collecting portion 82 is disposed at the periphery of the sleeve 22 of the first pivot holder 20, and catches liquid such as water flowing in from the leading end side of the first pivot shaft 30. The drainage portion 84 drains the liquid such as water that has been caught by the water collecting portion 82 from a predetermined position.

A bottom wall of the water collecting portion 82 configures a collector portion 82A. The collector portion 82A is disposed at the periphery of the first pivot shaft 30 (sleeve 22) with its plate thickness direction aligned with the axial direction of the first pivot shaft 30. A face of the collector portion 82A on the leading end side of the first pivot shaft 30 configures a collecting face, and when a liquid such as water flows onto the collecting face of the collector portion 82A, the liquid flows toward the front of the water collecting member 80 due to gravity. The external profile of the collector portion 82A is formed in a substantially C-shape opening toward the front as viewed from the leading end side of the first pivot shaft 30. A peripheral wall 80A, described later, is formed projecting from an outer edge of the collector portion 82A toward the leading end side of the first pivot shaft 30.

Figure 6A:
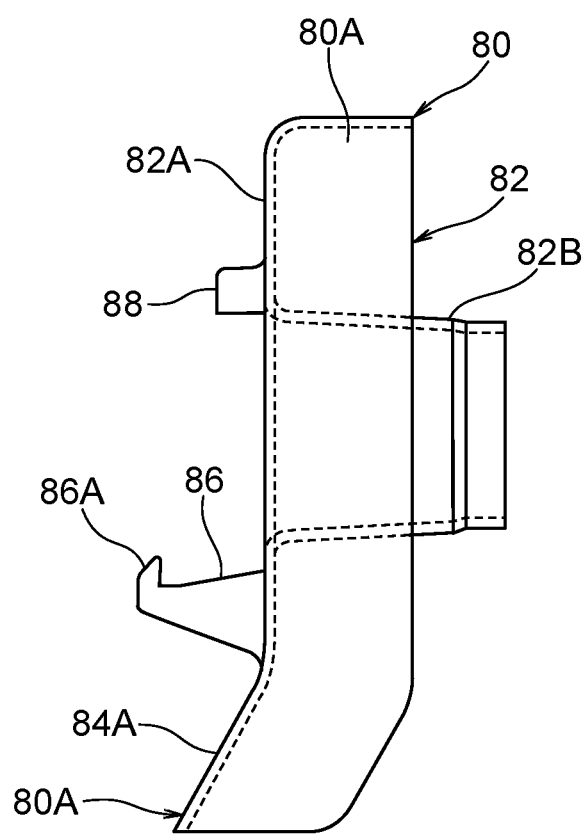
FIG. 6A is a side view of the water collecting member illustrated in FIG. 1A.

As is also illustrated in FIG. 6A and FIG. 6B, a substantially central portion of the collector portion 82A is integrally formed with a cap portion 82B that configures part of the water collecting portion 82. The cap portion 82B is formed in a tube shape (cylinder shape) running from the substantially central portion of the collector portion 82A toward the leading end side of the first pivot shaft 30. In other words, the collector portion 82A extends from a base end portion of the cap portion 82B toward the radial direction outside of the first pivot shaft 30. The sleeve 22 of the first pivot holder 20 is disposed at the inside of the cap portion 82B. The sleeve 22 is thus covered from the outside by the cap portion 82B.

An insertion hole 82B1, through which the sleeve 22 supporting the first pivot shaft 30 is inserted, is formed penetrating a leading end portion of the cap portion 82B. In an inserted state of the sleeve 22 through the insertion hole 82B1, the leading end portion of the cap portion 82B is mounted to the sleeve 22 in a state in which an inner peripheral face of the insertion hole 82B1 is in tight contact with an outer peripheral face of the sleeve 22. Liquid such as water is thereby suppressed or prevented from entering between the insertion hole 82B1 and the sleeve 22, and thus reaching the ball joints 79A, 77A of the first lever 32. Note that the penetration of water between the sleeve 22 and the first pivot shaft 30 is prevented by an O-ring or the like, not illustrated in the drawings. A leading end portion of the sleeve 22 is covered by a skirt formed to the wiper arm, not illustrated in the drawings, thereby preventing the incursion of water.

On the other hand, a bottom wall of the drainage portion 84 configures a slope 84A. The slope 84A extends from a front end of the collector portion 82A, and is inclined toward the base end side of the first pivot shaft 30 on progression toward the front in side view. In other words, in plan view, the drainage portion 84 extends from the front end of the collector portion 82A toward the front. In plan view, a line passing through the axis of the first pivot shaft 30 and running in the extension direction of the drainage portion 84 configures a reference line CL.

Further, in the water collecting member 80, the peripheral wall 80A is formed projecting toward the leading end side of the first pivot shaft 30 (device upper side) from an outer edge of the collector portion 82A and an outer edge of the slope 84A, with the exception of at a portion at a leading end of the slope 84A. Water or the like flowing into the collector portion 82A accordingly flows from the collector portion 82A to the slope 84A, and is drained from the leading end of the slope 84A.

Moreover, the engaging claw portion 86 is integrally formed at a boundary between the collector portion 82A and the slope 84A. The engaging claw portion 86 projects from the collector portion 82A and the slope 84A toward the base end side of the first pivot shaft 30. The slope 84A is thus reinforced by the engaging claw portion 86, increasing the rigidity of the drainage portion 84 (slope 84A). The engaging claw portion 86 is disposed on the reference line CL in plan view. Moreover, a leading end portion of the engaging claw portion 86 is integrally formed with a hook portion 86A. The hook portion 86A projects from the engaging claw portion 86 toward a radial direction inside of the first pivot shaft 30. In an assembled state of the water collecting member 80 to the first pivot holder 20, the hook portion 86A fits into the recess portion 22A2 of the first engagement portion 22A of the first pivot holder 20. The hook portion 86A thus engages with the first engagement portion 22A in a peripheral direction of the first pivot shaft 30, thereby limiting peripheral direction movement of the water collecting member 80 with respect to the first pivot holder 20. Moreover, the hook portion 86A also engages with the first engagement portion 22A in the axial direction of the first pivot shaft 30, thereby limiting movement of the water collecting member 80 toward the leading end side of the first pivot holder 20.

The collector portion 82A is also integrally formed with the engaging projection 88. The engaging projection 88 is formed in a substantially rectangular block shape, and projects from the collector portion 82A toward the base end side of the first pivot shaft 30. The engaging projection 88 is disposed on the opposite side of the first pivot shaft 30 to the engaging claw portion 86 (at a position 180° apart around the peripheral direction), and is disposed on the reference line CL in plan view. In an assembled state of the water collecting member 80 to the first pivot holder 20, the hook portion 86A fits into the recess portion 22B1 in the second engagement portion 22B of the first pivot holder 20. The engaging projection 88 accordingly engages with the second engagement portion 22B in the peripheral direction of the first pivot shaft 30, such that the engaging projection 88 limits peripheral direction movement of the water collecting member 80 with respect to the first pivot holder 20.

Next, explanation follows regarding the marks that configure an assembly guide during assembly of water collecting members 80 to the first pivot holder 20 and the second pivot holder 50. The marks include first marks 90 (see FIG. 1A) formed to the water collecting member 80, and second marks 92 (see FIG. 1A and FIG. 8A) formed to the first pivot holder 20 and the second pivot holder 50 respectively.

As illustrated in FIG. 6B, the first marks 90 are formed on the collecting face of the collector portion 82A of the water collecting member 80 so as to be visible from the leading end side of the first pivot shaft 30 (second pivot shaft 60). The first marks 90 are therefore visible from the leading end side of the first pivot shaft 30 (second pivot shaft 60) during assembly of water collecting members 80 to the first pivot holder 20 and the second pivot holder 50. The first marks 90 are recessed, and are formed to the water collecting member 80 during molding of the water collecting member 80. Namely, shapes corresponding to the first marks 90 are formed in a mold used to mold the water collecting member 80.

The collector portion 82A is formed with plural of the first marks 90 (at six locations in the present exemplary embodiment). Specifically, the first marks 90 are formed at three locations at a portion of the collector portion 82A on one side of the reference line CL (on one length direction side of the vehicle wiper device 10). The first marks 90 are also formed at three locations at a portion of the collector portion 82A on the other side of the reference line CL (on the other length direction side of the vehicle wiper device 10). The first marks 90 are disposed at intervals of a predetermined angle around the peripheral direction of the first pivot shaft 30 (second pivot shaft 60). The first marks 90 disposed at the three locations on the one side of the reference line CL are marks used when assembling the water collecting member 80 to the first pivot holder 20, and the first marks 90 disposed at the three locations on the other side of the reference line CL are marks used when assembling the water collecting member 80 to the second pivot holder 50. Note that the angular intervals between the first marks 90 in the peripheral direction of the first pivot shaft 30 (second pivot shaft 60) are set as appropriate according to the assembled orientation of the water collecting member 80 to wiper devices in various vehicle models.

The first marks 90 include first positioning marks 90A configuring guides for the correct assembly orientation (position) of the water collecting member 80 with respect to the first pivot holder 20 (second pivot holder 50), and first identifying marks 90B used to identify which mark out of the plural first marks 90 should be used. The first positioning marks 90A are configured by geometric shapes or the like. In the present exemplary embodiment, the first positioning marks 90A are configured by geometric isosceles triangle shapes. The first positioning marks 90A are disposed with the tips of the triangles pointing toward the radial direction outside of the first pivot shaft 30 (second pivot shaft 60). Note that in the above example, the first positioning marks 90A are configured by geometric shapes as an example. However, the first positioning marks 90A may be configured by arrows, lines, or the like.

The first identifying marks 90B are disposed further to the radial direction inside of the first pivot shaft 30 (second pivot shaft 60) than the first positioning marks 90A. The first identifying marks 90B are configured by letters, numbers, or the like (in the present exemplary embodiment, the first identifying marks 90B are configured by numbers). A different number is allocated to each of the plural first identifying marks 90B. Specifically, the first identifying marks 90B used during assembly to the first pivot holder 20 are allocated the numbers 4 to 6, and the first identifying marks 90B used during assembly to the second pivot holder 50 are allocated the numbers 1 to 3.

In the vehicle wiper device 10 of the present exemplary embodiment, when assembling the water collecting member 80 to the first pivot holder 20, the first mark 90 that includes the first identifying mark 90B allocated the number 5 is employed (see FIG. 1A). Note that in a vehicle wiper device to which the water collecting member 80 is assembled in a state rotated further toward one peripheral direction side of the first pivot shaft 30 (the arrow G direction in FIG. 1A) than in the present exemplary embodiment, setting is made such that the first mark 90 that includes the first identifying mark 90B allocated the number 4 is used. Moreover, in a vehicle wiper device to which the water collecting member 80 is assembled in a state rotated further toward the other peripheral direction side of the first pivot shaft 30 (the arrow H direction in FIG. 1A) than in the present exemplary embodiment, setting is made such that the first mark 90 that includes the first identifying mark 90B allocated the number 6 is used.

Figure 8A:
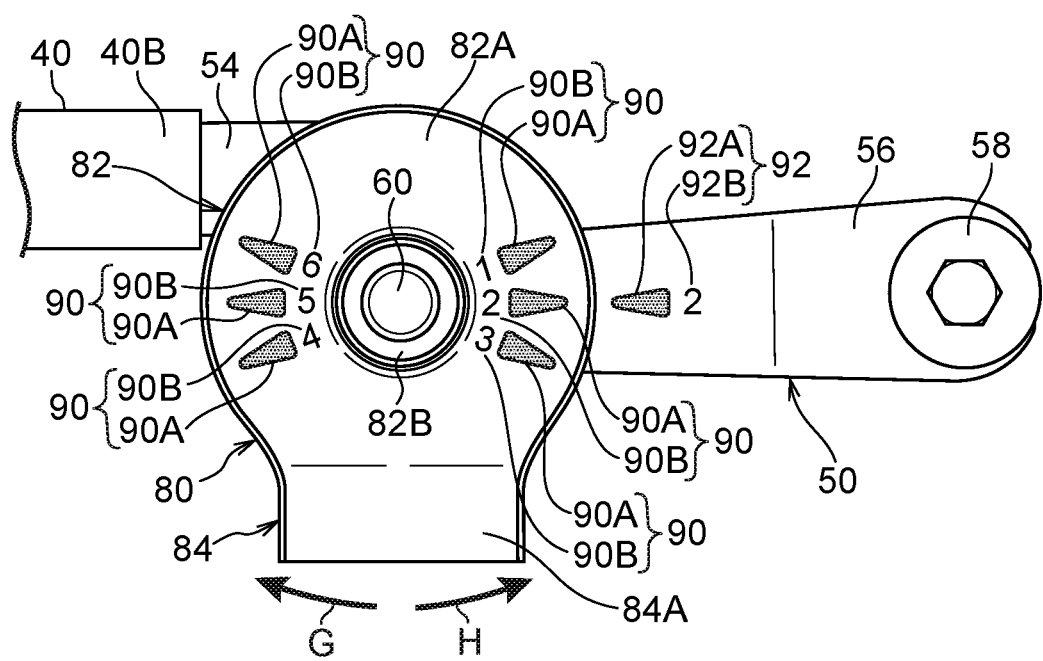
FIG. 8A is a plan view illustrating an assembled state of the water collecting member illustrated in FIG. 2 to a second pivot holder, as viewed from a leading end side of a second pivot shaft.

Moreover, as illustrated in FIG. 8A, in the vehicle wiper device 10 of the present exemplary embodiment, when assembling the water collecting member 80 to the second pivot holder 50, the first mark 90 that includes the first identifying mark 90B allocated the number 2 is employed. In a vehicle wiper device in which the water collecting member 80 is assembled in a state rotated further toward one peripheral direction side of the second pivot shaft 60 (the arrow G direction in FIG. 8A) than in the present exemplary embodiment, setting is made such that the first mark 90 that includes the first identifying mark 90B allocated the number 1 is used (see FIG. 8C). Moreover, in a vehicle wiper device in which the water collecting member 80 is assembled in a state rotated further toward the other peripheral direction side of the second pivot shaft 60 (the arrow H direction in FIG. 8A) than in the present exemplary embodiment, setting is made such that the first mark 90 that includes the first identifying mark 90B allocated the number 3 is used (see FIG. 8B).

Figure 8B:
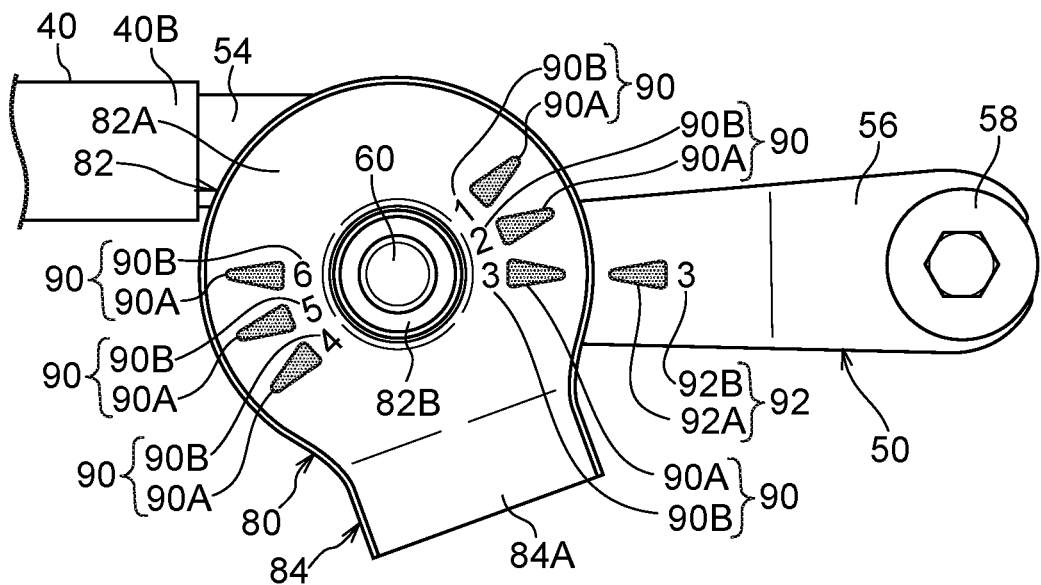
FIG. 8B is a plan view illustrating an example of placement of a water collecting member in a different orientation to that of the water collecting member illustrated in FIG. 8A.
Figure 8C:
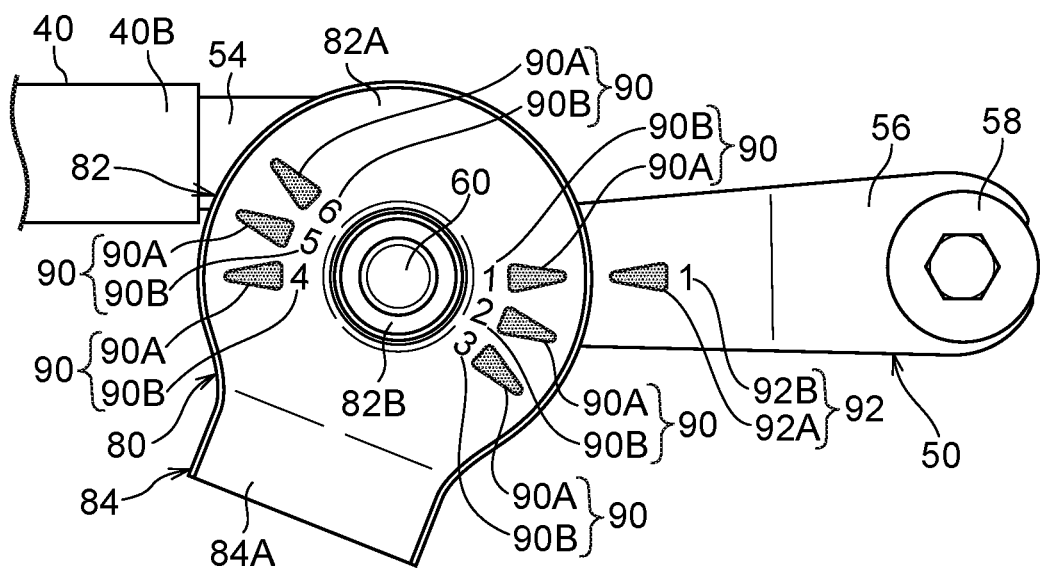
FIG. 8C is a plan view illustrating another example of placement of a water collecting member in a different orientation to that of the water collecting member illustrated in FIG. 8A.

As illustrated in FIG. 1A and FIG. 1B, and in FIG. 8A to FIG. 8C, the respective second marks 92 are formed to the fixing leg portion 26 of the first pivot holder 20 and the fixing leg portion 56 of the second pivot holder 50. Since the second marks 92 formed to the fixing leg portion 26 and the fixing leg portion 56 are similar in configuration, explanation is given regarding the second mark 92 formed to the fixing leg portion 26, and explanation regarding the second mark 92 formed to the fixing leg portion 56 will be omitted.

As illustrated in FIG. 1A, the second mark 92 is formed on a face (an upper face) of the fixing leg portion 26 so as to face the leading end side of the first pivot shaft 30. The second mark 92 is disposed further to the radial direction outside of the first pivot shaft 30 than the water collecting member 80 in an assembled state of the water collecting member 80 to the first pivot holder 20. The second mark 92 is therefore visible from the leading end side of the first pivot shaft 30 during assembly of the water collecting member 80 to the first pivot holder 20. The second mark 92 is recessed, and is formed to the first pivot holder 20 during molding of the first pivot holder 20. Namely, shapes corresponding to the second mark 92 are formed in a mold used to mold the first pivot holder 20.

Similarly to the first marks 90, each second mark 92 is configured including a second positioning mark 92A and a second identifying mark 92B. The second positioning mark 92A is a mark configuring a guide for correct assembly orientation (position) of the water collecting member 80 with respect to the first pivot holder 20. The second identifying mark 92B is a mark used to identify which mark of the plural first marks 90 on the water collecting member 80 to be assembled should be used. The second positioning mark 92A is, for example, configured by the same geometric shape as the first positioning marks 90A of the first marks 90. Namely, in the present exemplary embodiment, the second positioning mark 92A is configured by a geometric isosceles triangle shape. The second positioning mark 92A is disposed such that the tip of the triangle points toward the radial direction inside of the first pivot shaft 30 (the first pivot shaft 30 side).

The second identifying mark 92B is disposed further to the radial direction outside of the first pivot shaft 30 than the second positioning mark 92A. The second identifying mark 92B is configured by a letter, a number, or the like, similarly to the first identifying marks 90B of the first marks 90. Namely, in the present exemplary embodiment, the second identifying mark 92B is configured by a number. The number of the second identifying mark 92B matches one of the plural first identifying marks 90B. Namely, the second mark 92 is a mark that forms a pair with one of the plural first marks 90. The first identifying mark 90B that forms a pair with the second identifying mark 92B is used when assembling the water collecting member 80 to the first pivot shaft 30. Namely, in the present exemplary embodiment, the second identifying mark 92B of the second mark 92 of the first pivot holder 20 is allocated the number 5. The second identifying mark 92B of the second mark 92 of the second pivot holder 50 is allocated the number 2 (see FIG. 8A).

As described above, the first pivot holder 20 and the second pivot holder 50 come in plural types. The direction in which the water collecting member 80 should be attached to the first pivot holder 20 or the second pivot holder 50 differs between each of the plural types of the first pivot holder 20 and the second pivot holder 50. The second mark 92 includes the second identifying mark 92B and the second positioning mark 92A corresponding to the type of the first pivot holder 20 or second pivot holder 50. The plural first marks 90 include the first identifying marks 90B and the first positioning marks 90A corresponding to the plural types of the first pivot holder 20 and the second pivot holder 50. The formation positions of the second identifying mark 92B and the second positioning mark 92A of the second mark 92, and of the plural first identifying marks 90B and first positioning marks 90A of the first marks 90, are determined and disposed such that when the water collecting member 80 is assembled to the first pivot holder 20 or the second pivot holder 50 such that the second identifying mark 92B of the second mark 92 corresponds to the first identifying mark 90B of the first mark 90, and the second positioning mark 92A of the second mark 92 faces the corresponding first positioning mark 90A of the first mark 90 along the radial direction of the first pivot shaft 30, 60, the water collecting member 80 will be assembled in the correct direction for that type of the first pivot holder 20 or the second pivot holder 50.

Note that in the above example, the first marks 90 and the second marks 92 are formed so as to be recessed. However, the first marks 90 and the second marks 92 may be formed so as to protrude. Moreover, the first marks 90 and the second marks 92 may, for example, be formed by printing on or engraving each of the water collecting member 80, the first pivot holder 20, and the second pivot holder 50.

Next, explanation follows regarding operation and advantageous effects of the present exemplary embodiment, while explaining procedures for assembling the water collecting member 80 to the first pivot holder 20 or the second pivot holder 50.

As illustrated in FIG. 4 and FIG. 5, when assembling the water collecting member 80 to the first pivot holder 20, a worker disposes the water collecting member 80 at the leading end side of the first pivot shaft 30, and disposes the cap portion 82B of the water collecting member 80 so as to be coaxial with the first pivot shaft 30. When this is performed, the worker identifies which of the first marks 90 of the water collecting member 80 is to be used, and aligns the orientation (position) of the water collecting member 80 in the peripheral direction of the first pivot shaft 30. Specifically, as illustrated in FIG. 1A, the worker identifies the first mark 90 that forms a pair with the second mark 92 formed to the first pivot holder 20. Namely, the worker identifies the first identifying mark 90B that matches the second identifying mark 92B. In the present exemplary embodiment, the second identifying mark 92B and the first identifying mark 90B allocated the number 5 match each other. Accordingly, the first mark 90 including the first identifying mark 90B allocated the number 5 is the mark that should be used. The worker aligns the orientation (position) of the water collecting member 80 in the peripheral direction of the first pivot shaft 30 such that the first positioning mark 90A of the first mark 90 to be used faces the second positioning mark 92A of the second mark 92 along the radial direction of the first pivot shaft 30 as viewed from the leading end side of the first pivot shaft 30.

After aligning the peripheral direction orientation (position) of the water collecting member 80, the worker moves the water collecting member 80 toward the base end side of the first pivot shaft 30, and inserts the first pivot shaft 30 and the sleeve 22 of the first pivot holder 20 through the cap portion 82B of the water collecting member 80. The worker then moves the water collecting member 80 further toward the base end side of the first pivot shaft 30, and fits the engaging projection 88 inside the recess portion 22B1 of the second engagement portion 22B of the first pivot holder 20. The engaging projection 88 thus engages with the second engagement portion 22B in the peripheral direction of the first pivot shaft 30. When this is performed, the worker also fits the hook portion 86A of the engaging claw portion 86 into the recess portion 22A2 of the first engagement portion 22A of the first pivot holder 20. The engaging claw portion 86 thus engages with the first engagement portion 22A in the peripheral direction of the first pivot shaft 30, and also engages with the first engagement portion 22A in the axial direction of the first pivot shaft 30. The water collecting member 80 is thus assembled to the first pivot holder 20 in a state in which movement of the water collecting member 80 in the peripheral direction is limited, and movement of the water collecting member 80 toward the leading end side is limited. In the assembled state of the water collecting member 80 to the first pivot holder 20, the drainage portion 84 of the water collecting member 80 is disposed at the front side of the first pivot shaft 30.

Figure 7A:
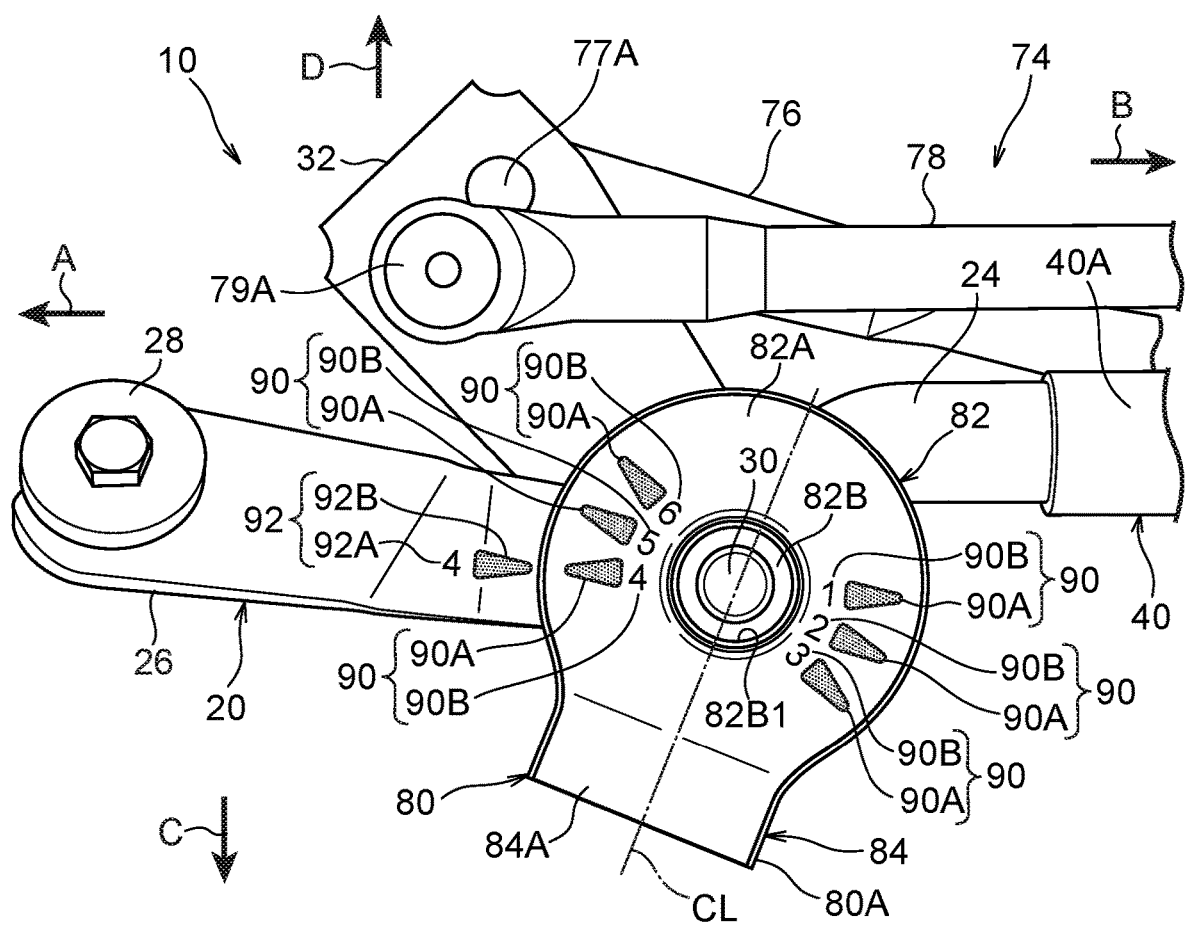
FIG. 7A is a plan view illustrating an example of placement of a water collecting member in a different orientation to that of the water collecting member illustrated in FIG. 1A.
Figure 7B:
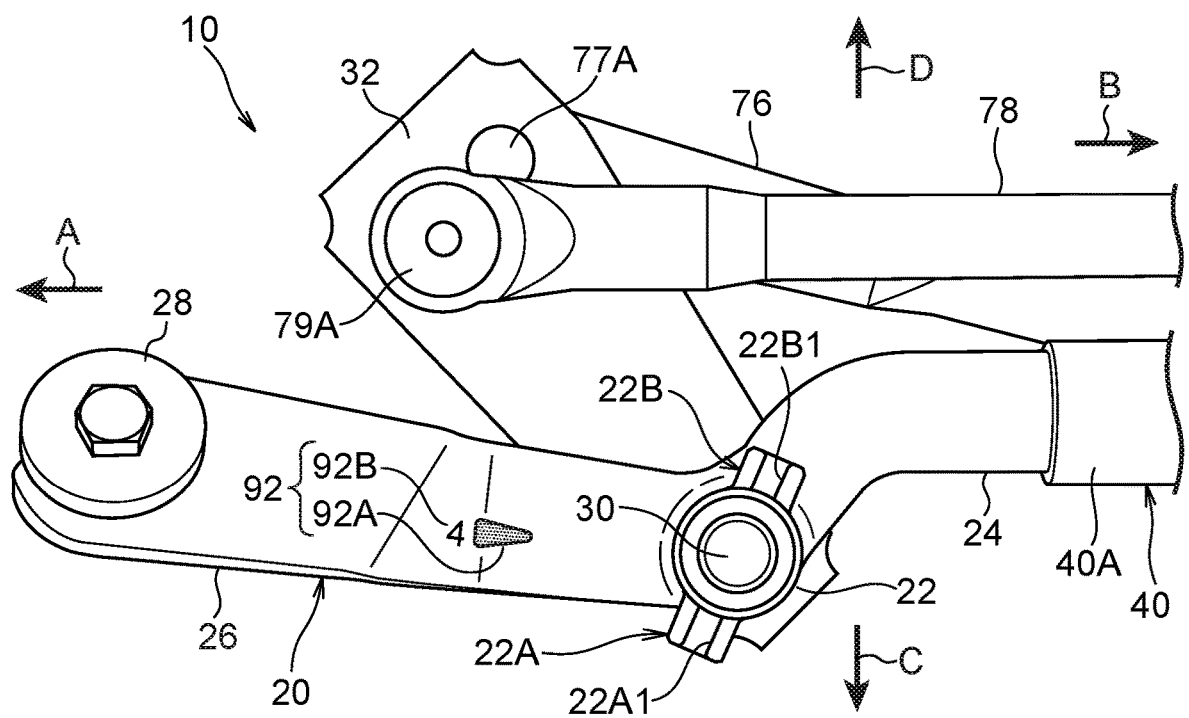
FIG. 7B is a plan view illustrating the water collecting member of FIG. 7A in a state removed from a first pivot holder.

Note that for a vehicle wiper device, the assembly orientation of the water collecting member 80 might also differ depending on the vehicle model. Specifically, the position of the drainage portion 84 of the water collecting member 80 may be set so as to be offset toward one peripheral direction side of the first pivot shaft 30 (the arrow G direction side in FIG. 1A) or toward the other peripheral direction side of the first pivot shaft 30 (the arrow H direction side in FIG. 1A) in comparison to the present exemplary embodiment. Accordingly, for example, in cases in which the position of the drainage portion 84 of the water collecting member 80 is set so as to be offset toward the one peripheral direction side of the first pivot shaft 30 in comparison to the present exemplary embodiment, as illustrated in FIG. 7A, then as illustrated in FIG. 7B, a universal water collecting member 80 can be employed by shifting the position of the first engagement portion 22A and the second engagement portion 22B toward the one peripheral direction side of the first pivot shaft 30 with respect to that in the present exemplary embodiment. Note that in general, universal pivot holders are difficult to achieve due to differences in the length, shape, extension direction, and the like of the fixing leg portions depending on the vehicle model.

The first mark 90 including the first identifying mark 90B allocated the number 4 is formed to the water collecting member 80 corresponding to the offset amount of the first engagement portion 22A and the second engagement portion 22B. The second mark 92 including the second identifying mark 92B with the same number 4 is formed to the first pivot holder 20. Accordingly, similarly to in the assembly procedure described above, incorrect assembly of the universal water collecting member 80 can be prevented when assembling the water collecting member 80 to the first pivot holder 20 by aligning the orientation of the water collecting member 80 in the peripheral direction of the first pivot shaft 30 such that the first positioning mark 90A of the first mark 90 to be used faces the second positioning mark 92A of the second mark 92 along the radial direction of the first pivot shaft 30.

Note that although not illustrated in the drawings, in cases in which the position of the drainage portion 84 of the water collecting member 80 is set offset toward the other peripheral direction side of the first pivot shaft 30 in comparison to the first exemplary embodiment, a universal water collecting member 80 can be employed by shifting the positions of the first engagement portion 22A and the second engagement portion 22B toward the other peripheral direction side of the first pivot shaft 30. In such cases, similarly to as described above, the first mark 90 including the first identifying mark 90B allocated the number 6 is formed to the water collecting member 80 corresponding to the offset amount of the first engagement portion 22A and the second engagement portion 22B. Moreover, the second mark 92 including the second identifying mark 92B allocated the same number 6 is formed on the first pivot holder 20. The water collecting member 80 can thus be assembled to the first pivot holder 20 in a manner similar to that of the assembly procedure described above.

When assembling the water collecting member 80 to the second pivot holder 50, the water collecting member 80 is assembled using a similar assembly procedure to that for assembling the water collecting member 80 to the first pivot holder 20. Namely, as illustrated in FIG. 8A, in the present exemplary embodiment, the second identifying mark 92B and the first identifying mark 90B allocated the number 2 match each other, and so the first mark 90 including the first identifying mark 90B allocated the number 2 is the mark on the water collecting member 80 that should be used. The worker assembles the water collecting member 80 to the second pivot holder 50 while aligning the orientation of the water collecting member 80 in the peripheral direction of the second pivot shaft 60 such that the first positioning mark 90A of the first mark 90 to be used faces the second positioning mark 92A of the second mark 92 along the radial direction of the second pivot shaft 60.

Moreover, as illustrated in FIG. 8B, in the case of a wiper device for a different vehicle model in which the position of the drainage portion 84 of the water collecting member 80 with respect to the second pivot holder 50 is set so as to be offset toward the other peripheral direction side of the second pivot shaft 60 in comparison to the present exemplary embodiment, a universal water collecting member 80 can be employed by shifting the positions of the first engagement portion and the second engagement portion of the second pivot holder 50 toward the other peripheral direction side of the second pivot shaft 60. Moreover, in such cases, the water collecting member 80 is formed with the first mark 90 including the first identifying mark 90B allocated the number 3 corresponding to the amount by which the first engagement portion and the second engagement portion have been shifted. Moreover, the second pivot holder 50 is formed with the matching second mark 92 including the second identifying mark 92B allocated the number 3. The worker assembles the water collecting member 80 to the second pivot holder 50 while aligning the orientation of the water collecting member 80 in the peripheral direction of the second pivot shaft 60 such that the first positioning mark 90A of the first mark 90 to be used and the second positioning mark 92A of the second mark 92 face each other along the radial direction of the second pivot shaft 60.

Moreover, as illustrated in FIG. 8C, in the case of a wiper device for a different vehicle model in which the position of the drainage portion 84 of the water collecting member 80 with respect to the second pivot holder 50 is set so as to be offset toward the one peripheral direction side of the second pivot shaft 60 in comparison to the present exemplary embodiment, a universal water collecting member 80 can be employed by shifting the positions of the first engagement portion and the second engagement portion of the second pivot holder 50 toward the one peripheral direction side of the second pivot shaft 60. Moreover, in such cases, the water collecting member 80 is formed with the first mark 90 including the first identifying mark 90B allocated the number 1 corresponding to the amount by which the first engagement portion and the second engagement portion have been shifted. Moreover, the second pivot holder 50 is formed with the matching second mark 92 including the second identifying mark 92B allocated the number 1. The worker assembles the water collecting member 80 to the second pivot holder 50 while aligning the orientation of the water collecting member 80 in the peripheral direction of the second pivot shaft 60 such that the first positioning mark 90A of the first mark 90 to be used and the second positioning mark 92A of the second mark 92 face each other along the radial direction of the second pivot shaft 60.

As described above, in the vehicle wiper device 10 of the present exemplary embodiment, the universal water collecting member 80 is formed with plural of the first marks 90 serving as markers used when assembling the water collecting member 80 to the first pivot holder 20 (second pivot holder 50). The first pivot holder 20 (second pivot holder 50) is formed with the second mark 92, configuring a guide for the correct assembly orientation of the water collecting member 80 with respect to the first pivot holder 20 (second pivot holder 50), at a position to the radial direction outside of the water collecting member 80 in the radial direction of the first pivot shaft 30 (second pivot shaft 60). This second mark 92 forms a pair with one out of the plural first marks 90. This thereby enables the water collecting member 80 to be assembled in the correct position by aligning the second mark 92 and the first mark 90 that form a pair when assembling the water collecting member 80 to the first pivot holder 20 (second pivot holder 50). This thereby enables incorrect assembly of the water collecting member 80 to be prevented during when assembling the water collecting member 80 to the first pivot holder 20 (second pivot holder 50) in cases in which the universal water collecting member 80 is employed with vehicle wiper devices in various vehicle models.

The water collecting member 80 is formed with plural of the first marks 90 at a portion on one side of the reference line CL, and is formed with plural of the first marks 90 at a portion on the other side of the reference line CL. This thereby enables incorrect assembly of the universal water collecting member 80 to the first pivot shaft 30 or the second pivot shaft 60 to be prevented while enabling a universal water collecting member 80 to be employed for either the first pivot shaft 30 or the second pivot shaft 60.

The first marks 90 are formed on the collecting face of the collector portion 82A of the water collecting member 80. The second mark 92 is formed on the fixing leg portion 26 (fixing leg portion 56) of the first pivot holder 20 (second pivot holder 50) corresponding to an upper face of the first pivot shaft 30 (second pivot shaft 60), and is disposed at the radial direction outside of the water collecting member 80 in the radial direction of the first pivot shaft 30 (second pivot shaft 60). The first marks 90 and the second mark 92 are therefore visible during assembly of the water collecting member 80 to the first pivot holder 20 (second pivot holder 50). This thereby enables the ease of assembly of the water collecting member 80 to be further improved.

Moreover, in the water collecting member 80, the engaging claw portion 86 is integrally formed at the boundary between the collector portion 82A and the slope 84A, and the engaging claw portion 86 projects from the collector portion 82A toward the base end side of the first pivot shaft 30. The slope 84A of the drainage portion 84 is reinforced by the engaging claw portion 86, enabling the rigidity of the drainage portion 84 to be increased. This thereby enables, for example, the drainage portion 84 to be suppressed from curling toward the leading end side of the first pivot shaft 30 (second pivot shaft 60).

Note that in the present exemplary embodiment, the plural first marks 90 are formed on the collector portion 82A of the water collecting member 80 at portions on both sides of the reference line CL. Alternatively, the plural first marks 90 may be formed on the collector portion 82A of the water collecting member 80 at a portion on one or the other side of the reference line CL. In such cases, a universal water collecting member 80 can still be employed for the first pivot holders 20 of vehicle wiper devices in various vehicle models, and is still capable of preventing incorrect assembly of the water collecting member 80 to the first pivot holder 20. Alternatively, a universal water collecting member 80 can be employed for the second pivot holder 50 of vehicle wiper devices in various vehicle models, and enabling incorrect assembly of the water collecting member 80 to the second pivot holder 50 to be prevented.

Moreover, in the present exemplary embodiment, the plural first marks 90 are formed on the collector portion 82A of the water collecting member 80 at portions on both sides of the reference line CL. Alternatively, a single first mark 90 may be formed on both sides of the reference line of the collector portion 82A of the water collecting member 80. In such cases, incorrect assembly of the water collecting member 80 can be prevented while still employing a universal water collecting member 80 as a water collecting member 80 assembled to the first pivot holder 20 as and a water collecting member 80 assembled to the second pivot holder 50 of the vehicle wiper device.

The disclosure of Japanese Patent Application No. 2015-245416 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle wiper device comprising:
a pivot shaft that is rotated by drive force of a wiper motor;
a pivot holder that rotatably supports the pivot shaft;
a water collecting member that is assembled to the pivot holder and that includes a water collecting portion disposed at a radial direction outside of the pivot shaft and a drainage portion provided to a predetermined position on the water collecting portion so as to drain liquid collected by the water collecting portion; and
an anchor element provided to at least one of the pivot holder and the water collecting member and engaging the other of the pivot holder and the water collecting member;
the water collecting member being formed with a plurality of first marks configuring markers used in assembly of the water collecting member to the pivot holder;
the pivot holder being formed with a second mark that configures a guide for a correct assembly orientation of the water collecting member to the pivot holder; and
the second mark and at least one of the plurality of first marks other than the anchor element forming a pair in an engaging state of the pivot holder and the water collecting member by the anchor element, wherein the anchor element contributes to only engagement between the pivot holder and the water collecting member, and the first marks and the second mark do not contribute to the engagement.

2. The vehicle wiper device of claim 1, wherein the drainage portion extends from the predetermined position on the water collecting portion toward the radial direction outside of the pivot shaft, and as viewed from a leading end side of the pivot shaft the plurality of first marks are formed on one side of a reference line passing through an axis of the pivot shaft and extending along an extension direction of the drainage portion.

3. The vehicle wiper device of claim 1, wherein:
the pivot shaft includes a first pivot shaft and a second pivot shaft that are rotated by drive force of the wiper motor being transmitted through a link mechanism to each of the first pivot shaft and the second pivot shaft;
the pivot holder includes a first pivot holder that rotatably supports the first pivot shaft and a second pivot holder that rotatably supports the second pivot shaft;
the drainage portion extends from the predetermined position on the water collecting portion toward the radial direction outside of each pivot shaft;
a plurality of the first marks are formed on each side of a reference line passing through an axis of each pivot shaft and extending along an extension direction of the drainage portion as viewed from a leading end side of each pivot shaft; and
the second marks are respectively formed at the first pivot holder and the second pivot holder.

4. The vehicle wiper device of claim 1, wherein the first marks and the second mark are disposed so as to be visible when viewed from a leading end side of the pivot shaft.

5. The vehicle wiper device of claim 4, wherein:
the water collecting portion includes a collecting face that is visible when viewed from a leading end side of the pivot shaft; and
the first marks are formed on the collecting face.

6. The vehicle wiper device of claim 1, wherein:
the anchor element has an engaging projection and an engaging claw portion, the engaging projection and the engaging claw portion provided to the water collecting member,
the engaging projection projects from the water collecting portion toward a base end side of the pivot shaft, and that limits peripheral direction movement of the water collecting member in a state in which the engaging projection is engaged with the pivot holder in the peripheral direction, and
the engaging claw portion projects from the water collecting portion toward the base end side of the pivot shaft, and that limits movement of the water collecting member toward a leading end side of the pivot shaft in a state in which the engaging claw portion is engaged with the pivot holder in an axial direction; and
as viewed along an axial direction of the pivot shaft, the engaging claw portion is disposed on a side of the drainage portion of the pivot shaft, and the engaging projection is disposed on an opposite side of the pivot shaft to the drainage portion.

7. The vehicle wiper device of claim 6, wherein the anchor element has a first engagement portion to which the engaging projection is engaged and a second engagement portion to which the engaging claw portion is engaged, the first engagement portion and the second engagement portion provided to the pivot holder, and
the pivot holder includes a sleeve supporting the pivot axis.

8. The vehicle wiper device of claim 1, wherein:
a direction of the pivot holder, which is attached to the water collecting member, is predetermined;
the second mark includes an identifying mark and a positioning mark corresponding to the pivot holder;
each of the plurality of first marks includes an identifying mark and a positioning mark respectively corresponding to the pivot holder; and
the identifying mark and the positioning mark of the second mark, and the identifying mark and the positioning mark of each of the plurality of first marks, are disposed the pivot holder in the correct assembly orientation of the water collecting member corresponding to the pivot holder when the water collecting member is assembled to the pivot holder such that the identifying mark of the second mark and the identifying mark of the first mark correspond with each other and the positioning mark of the second mark and the positioning mark of the first mark face each other along the radial direction of the pivot shaft.

9. The vehicle wiper device of claim 1, wherein:
the first marks are formed by printing on or engraving the water collecting member, and
the second mark is formed by printing on or engraving the pivot holder.

10. The vehicle wiper device of claim 1, wherein the plurality of the first marks are formed at three locations on one side of a reference line passing through an axis of the pivot shaft and extending along an extension direction of the drainage portion as viewed from a leading end side of the pivot shaft.

11. The vehicle wiper device of claim 1, wherein the plurality of first marks are disposed at intervals of a predetermined angle around the peripheral direction of the pivot shaft.

* * * * *